Patented May 19, 1931

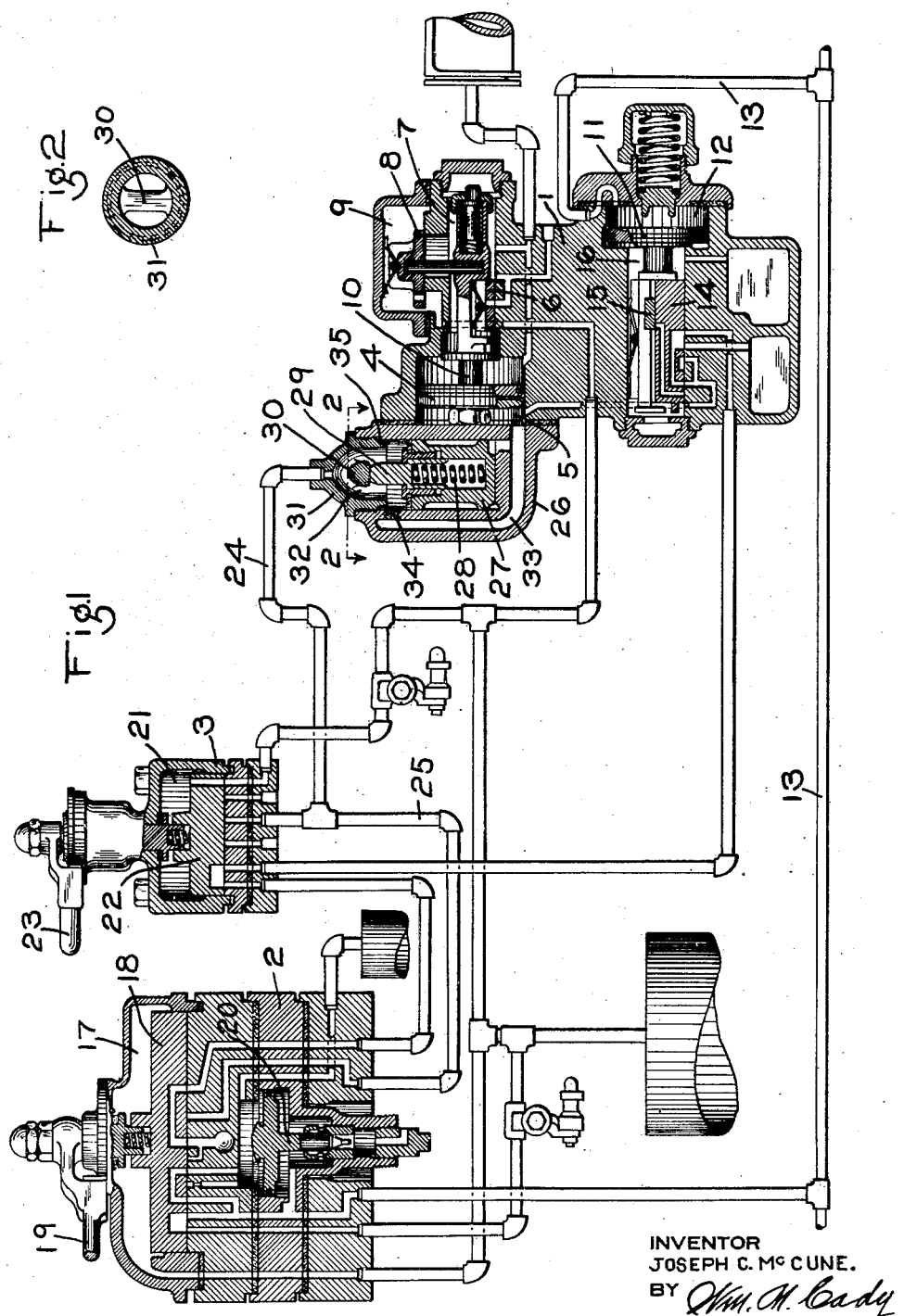

1,805,631

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE DEVICE

Application filed February 15, 1930. Serial No. 428,676.

This invention relates to fluid pressure brakes, and more particularly to a locomotive fluid pressure brake equipment.

The well known E. T. locomotive brake equipment comprises a distributing valve device, an automatic brake valve device, and an independent brake valve device.

The distributing valve device comprises an application and release portion having valves for controlling the admission and release of fluid under pressure to and from the locomotive brake cylinders and a piston operated by variations in fluid pressure in an application cylinder for operating said valves.

An application cylinder pipe connects the application cylinder with the independent brake valve device, so that by manipulation of the independent brake valve, the brakes on the locomotive may be applied and released independently of the train brakes.

The distributing valve device also includes an equalizing portion comprising valve means for controlling the admission and release of fluid under pressure to and from the application cylinder and a piston operated by variations in brake pipe pressure for operating said valve means.

If the application cylinder pipe should become broken, fluid pressure could not be supplied to or maintained in the application cylinder, with the result that the locomotive brakes could not be applied, or if applied, would release, due to the loss of fluid pressure through the broken application cylinder pipe.

The principal object of my invention is to provide a locomotive fluid pressure brake equipment having an application cylinder pipe, and means for preventing loss of fluid under pressure from the application cylinder in case the application cylinder pipe should break.

In the accompanying drawings; Fig. 1 is a diagrammatic view, mainly in section, of a locomotive brake equipment embodying my invention; and Fig. 2 a section on the line 2—2 of Fig. 1.

As shown in the drawings, the locomotive brake equipment comprises a distributing valve device 1, an automatic brake valve device 2, and an independent brake valve device 3.

The distributing valve device 1 comprises an application and release portion and an equalizing portion. The application and release portion comprises an application piston 4 contained in an application cylinder 5, a release slide valve 6, contained in valve chamber 7, and an application valve 8, contained in valve chamber 9, said valves being operated by piston 4, through a stem 10.

The equalizing portion comprises a piston 11, contained in piston chamber 12, which is connected to brake pipe 13, a main slide valve 14, and a graduating valve 15, contained in valve chamber 16, and adapted to be operated by piston 11.

The automatic brake valve device 2 comprises a casing having a valve chamber 17, containing a rotary valve 18, adapted to be operated by handle 19, and contained in the casing is the usual equalizing discharge valve mechanism 20.

The independent brake valve device 3 comprises a casing having a valve chamber 21, containing a rotary slide valve 22, adapted to be operated by handle 23.

An application cylinder pipe 24 leads to the seat of valve 22 and has a branch pipe 25, leading to the seat of rotary valve 18.

According to my invention, a cut-off valve device controls communication from the application cylinder 5 to the application cylinder pipe 24 and may be incorporated in a special application cylinder cap 26 and may comprise a hollow valve piston 27 containing a coil spring 28 which engages a movable member 29 mounted in said piston. The member 29 engages a cross bar 30 formed in the screw cap 31, so that upward movement of the valve piston is resisted by the compression of spring 28.

The application cylinder pipe 24 communicates with chamber 32 in the cap 31, and a passage 33 connects application cylinder 5 with said chamber, a choke plug having a restricted port 34 being interposed in said passage to limit the rate of flow of fluid from the passage 33 to chamber 32.

In operation, in view of the fact that the E. T. locomotive brake equipment, as shown in the drawings, is well known in the art and that its operation is understood by those skilled in the art, it is not deemed necessary to explain the operation of the apparatus except as it is involved in connection with my improvement. It will be understood that when the brake pipe pressure is reduced by operation of the automatic brake valve 2, the equalizing portion of the distributing valve device 1 is operated to supply fluid under pressure to the application cylinder 5. The brakes may be applied and released on the locomotive independently of the train brakes by operating the independent brake valve 3 to supply and release fluid under pressure through the application cylinder pipe 24 to and from the application cylinder 5.

With my improvement, when the independent brake valve 3 is operated to apply the locomotive brakes independently of the train brakes, fluid under pressure is supplied through pipe 24 and the restricted port 34 to passage 33 and thence to the application cylinder 5, and fluid under pressure may be released from the application cylinder through the same communication, when the independent brake valve is operated to release the locomotive brakes.

If the application cylinder pipe 24 should become broken, and fluid under pressure is supplied to the application cylinder 5 by operation of the equalizing portion of the distributing valve device or should there be fluid under pressure in the application cylinder at the time the application cylinder pipe breaks, the fluid pressure acting on the upper face of the valve piston 27 will be reduced to atmospheric pressure due to the break in the application pipe, and the restricted port 34, limiting the rate of flow from passage 33 and the application cylinder 5, the fluid pressure in the application cylinder, acting on the lower face of the valve piston will cause the valve piston to be shifted upwardly against the pressure of spring 28, so that the valve piston engages a seat rib 35 and thus cuts off communication from passage 33 and the application cylinder 5 to the application cylinder pipe 24. Thus loss of fluid from the application cylinder will be automatically prevented, in case the application cylinder pipe should break.

When the brakes are released, and fluid under pressure is released from the application cylinder 5, the valve piston 27 will be returned to normal position by the spring 28, and when the break in the application cylinder pipe 24 has been repaired, the brakes may be again controlled in the usual manner.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a locomotive brake equipment, the combination with a brake cylinder, valve means for controlling the supply of fluid under pressure to said brake cylinder, and a piston operated by an increase in pressure in an application cylinder for operating said valve means, of an application cylinder pipe through which fluid under pressure is supplied to said application cylinder, and a valve device providing a normally open communication from said cylinder to said pipe and operated by fluid pressure in the application cylinder upon breakage of said pipe for cutting off communication from the application cylinder to the application cylinder pipe.

2. In a locomotive brake equipment, the combination with a brake cylinder, valve means for controlling the supply of fluid under pressure to said brake cylinder, and a piston operated by an increase in pressure in an application cylinder for operating said valve means, of an application cylinder pipe through which fluid under pressure is supplied to said application cylinder, and a valve device providing a normally open communication from said cylinder to said pipe and movable from its open to its closed position by application cylinder pressure upon rupture of said pipe.

3. In a locomotive brake equipment, the combination with a brake cylinder, valve means for controlling the supply of fluid under pressure to said brake cylinder, and a piston operated by an increase in pressure in an application cylinder for operating said valve means, of an application cylinder pipe through which fluid under pressure is supplied to said application cylinder, a spring, and valve means normally held by said spring in a position establishing communication from said cylinder to said pipe, said valve means being operated by application cylinder pressure upon breakage of the application cylinder pipe to close said communication.

4. In a locomotive brake equipment, the combination with a brake cylinder, valve means for controlling the supply of fluid under pressure to said brake cylinder, and a piston operated by an increase in pressure in an application cylinder for operating said valve means, of an application cylinder pipe through which fluid under pressure is supplied to said application cylinder, a spring, and a valve piston subject to the opposing pressures of said spring and the pressure in the application cylinder and normally establishing a two way communication between the cylinder and said pipe and operated upon a reduction in pressure in said pipe for closing said communication.

In testimony whereof I have hereunto set my hand, this 13th day of February, 1930.

JOSEPH C. McCUNE.